(12) United States Patent
Myer et al.

(10) Patent No.: US 10,850,631 B2
(45) Date of Patent: Dec. 1, 2020

(54) RECEPTACLE CONNECTOR FOR CHARGING INLET ASSEMBLY

(71) Applicant: TE CONNECTIVITY CORPORATION, Berwyn, PA (US)

(72) Inventors: Nathan Philip Myer, Lancaster, PA (US); Aaron James de Chazal, Rochester, MI (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/383,738

(22) Filed: Apr. 15, 2019

(65) Prior Publication Data

US 2020/0223321 A1 Jul. 16, 2020

Related U.S. Application Data

(60) Provisional application No. 62/791,074, filed on Jan. 11, 2019.

(51) Int. Cl.
| | |
|---|---|
| *H01R 13/62* | (2006.01) |
| *B60L 53/16* | (2019.01) |
| *H02J 7/00* | (2006.01) |
| *H01R 13/627* | (2006.01) |
| *H01R 13/05* | (2006.01) |
| *H01R 13/66* | (2006.01) |

(52) U.S. Cl.
CPC ............ *B60L 53/16* (2019.02); *H01R 13/052* (2013.01); *H01R 13/6271* (2013.01); *H01R 13/6683* (2013.01); *H02J 7/0045* (2013.01)

(58) Field of Classification Search
CPC .................................................... H01R 13/629
USPC ...................................................... 439/310, 34
See application file for complete search history.

(56) References Cited

U.S. PATENT DOCUMENTS

| | | | |
|---|---|---|---|
| 2004/0235365 A1 | 11/2004 | Fujita | |
| 2016/0006156 A1* | 1/2016 | Shimizu | H01R 13/4367 439/310 |
| 2016/0072213 A1* | 3/2016 | Ichio | H01R 13/4367 439/34 |
| 2016/0072224 A1* | 3/2016 | Ichio | H01R 13/4367 439/345 |
| 2016/0126681 A1 | 5/2016 | Kawai et al. | |

OTHER PUBLICATIONS

International Search Report, International Application No. PCT IB2020/050061 International Filing Date, Jan. 6, 2020.

* cited by examiner

*Primary Examiner* — Phuong K Dinh

(57) ABSTRACT

A receptacle connector for a charging inlet assembly includes a housing and a terminal assembly coupled to the housing including cap extending from a pin. The pin is positioned in a terminal channel of the housing for mating with a charging connector. The pin has a rear flange and a rear mounting post with a base of the cap coupled thereto. A pad extends from the base configured to be coupled to a power cable. The receptacle connector includes a secondary lock assembly having a locking wall engaging and blocking rearward movement of the rear flange of the pin in a locked position. The locking wall is disengaged from the rear flange of the pin in an unlocked position.

20 Claims, 12 Drawing Sheets

RECEPTACLE CONNECTOR FOR CHARGING INLET ASSEMBLY

CROSS REFERENCE TO RELATED APPLICATIONS

This application claims benefit to U.S. Provisional Application No. 62/791,074, filed Jan. 11, 2019, titled "Ultrasonic Weld Pad with Secondary Lock Engagement on Charging Inlets", the subject matter of which is herein incorporated by reference in its entirety.

BACKGROUND OF THE INVENTION

The subject matter herein relates generally to charging inlet assemblies.

In order to charge a battery of an electric vehicle (EV) or hybrid electric vehicle (HEV), the vehicle is provided with a charging inlet assembly. A charging connector is configured to be mated with the charging inlet assembly. Terminals are held in a receptacle connector of a housing of the charging inlet assembly. The terminals extend through channels in the housing into a chamber at the rear of the housing for connection to corresponding power cables. In known charging inlet assemblies, safety features are provided in the housing, such as secondary locking features along the terminals, to ensure the terminals are properly positioned in the housing and secured in the housing. Other safety features in known charging inlet assemblies include temperature sensors along the terminals to monitor the temperature of the terminal during charging to shut off the system if the terminal overheats. Furthermore, it is required that the terminal be sealed within the housing to prevent moisture from entering the charging inlet assembly. Providing the sealing of the terminals, as well as coupling the safety components to the terminal along the terminal, add to the overall length of the terminal. The length of the terminal detrimentally affects the overall size of the charging inlet assembly by increasing the depth of the housing.

Furthermore, it is desirable to increase the amount of power transmitted through the terminals for charging the battery. Materials of the terminals and interfaces between the terminals and the power cables affect the resistance through the system. Additionally, routing of the power cables from the terminals out of the charging inlet assembly may be difficult due to the stiffness of the power cables and may require a larger chamber to accommodate routing of the power cables, increasing the overall size of the charging inlet assembly.

A need remains for a charging inlet assembly that may be manufactured in a cost effective and reliable manner having a low profile for use in a vehicle.

BRIEF DESCRIPTION OF THE INVENTION

In one embodiment, a receptacle connector for a charging inlet assembly is provided including a housing extending between a front and a rear. The housing has a chamber at the rear. The housing has a terminal channel between the front and the rear. The housing has a primary latch extending into the terminal channel. The receptacle connector includes a terminal assembly coupled to the housing. The terminal assembly includes a pin and a cap extending from the pin. The pin extends between a front and a rear. The pin has a mating shaft at the front positioned in the terminal channel for mating with a charging connector. The pin has a mounting head at the rear positioned in the terminal channel. The mounting head has a latching groove receiving the primary latch to hold the pin in the terminal channel. The mounting head has a rear flange at the rear and a rear mounting post extending rearward from the rear flange. The cap extends from the pin in the chamber. The cap has a base including an opening receiving the rear mounting post of the pin and a base wall surrounding the opening. The cap has a pad extending from the base configured to be coupled to a power cable. The receptacle connector includes a secondary lock assembly in the chamber. The secondary lock assembly is coupled to the terminal assembly. The secondary lock assembly has a secondary lock body including a locking wall. The secondary lock is movable between a locked position and an unlocked position. The locking wall engages and blocks rearward movement of the rear flange of the pin in the locked position. The locking wall is disengaged from the rear flange of the pin in the unlocked position.

In another embodiment, a charging inlet assembly is provided including a housing extending between a front and a rear. The housing defines a receptacle connector at the front configured for mating reception of a charging connector. The housing has a chamber at the rear. The housing has a terminal channel between the front and the rear. The housing has a primary latch extending into the terminal channel. The charging inlet assembly includes a terminal assembly coupled to the housing. The terminal assembly includes a pin and a cap extending from the pin. The pin extends between a front and a rear. The pin has a mating shaft at the front positioned in the terminal channel for mating with a charging connector. The pin has a mounting head at the rear positioned in the terminal channel. The mounting head has a latching groove receiving the primary latch to hold the pin in the terminal channel. The mounting head has a rear flange at the rear and a rear mounting post extending rearward from the rear flange. The cap extends from the pin in the chamber. The cap has a base including an opening receiving the rear mounting post of the pin and a base wall surrounding the opening. The cap has a pad extending from the base configured to be coupled to a power cable. The charging inlet assembly includes a secondary lock assembly in the chamber. The secondary lock assembly is coupled to the terminal assembly. The secondary lock assembly has a secondary lock body including a locking wall engaging and blocking rearward movement of the rear flange of the pin. The secondary lock assembly includes a sensor assembly received in the secondary lock body. The sensor assembly has a temperature sensor positioned proximate to the cap to sense a temperature of the terminal assembly.

In a further embodiment, a contact assembly for a charging inlet assembly is provided including a first terminal assembly and a second terminal assembly. The first terminal assembly includes a first pin and a first cap extending from the first pin. The first pin extends between a front and a rear. The first pin has a mating shaft at the front and a mounting head at the rear. The mounting head has a latching groove configured to receive a primary latch configured to hold the first pin in a housing of the charging inlet assembly. The mounting head has a rear flange at the rear and a rear mounting post extending rearward from the rear flange. The first cap has a first base including a first opening receiving the rear mounting post of the first pin and a first base opening surrounding the first opening. The first cap has a first pad extending from the first base configured to be coupled to a power cable. The second terminal assembly includes a second pin and a second cap extending from the second pin. The second pin extends between a front and a rear. The second pin has a mating shaft at the front and a mounting head at the rear. The mounting head has a latching groove configured to receive a primary latch configured to hold the second pin in a housing of the charging inlet assembly. The mounting head has a rear flange at the rear and a rear mounting post extending rearward from the rear flange. The second cap has a second base including a second opening receiving the rear mounting post of the second pin and a second base opening surrounding the second opening. The second cap has a second pad extending from the second base configured to be coupled to a power cable. The contact assembly includes a secondary lock assembly coupled to the first terminal assembly and the second terminal assembly. The secondary lock assembly has a secondary lock body including a first locking wall and a second locking wall. The secondary lock is movable between a locked position and an unlocked position. The first locking wall engages and blocks rearward movement of the rear flange of the first pin in the locked position and the second locking wall engages and blocks rearward movement of the rear flange of the second pin in the locked position. The first and second locking walls are disengaged from the rear flanges of the first and second pins in the unlocked position.

DETAILED DESCRIPTION OF THE INVENTION

Figure 1:
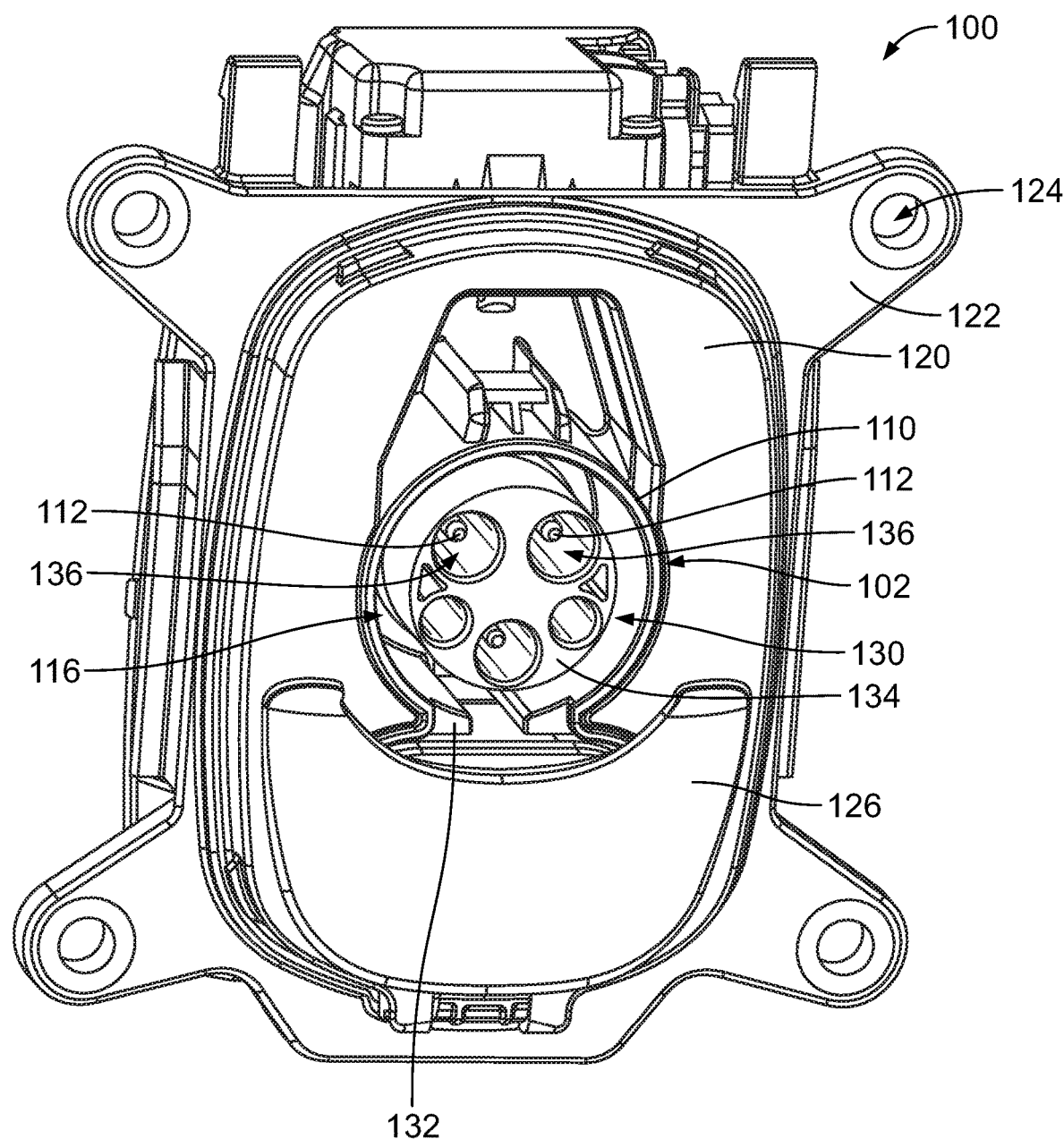
FIG. 1 is a front perspective view of a charging inlet assembly having a receptacle connector in accordance with an exemplary embodiment.
Figure 2:
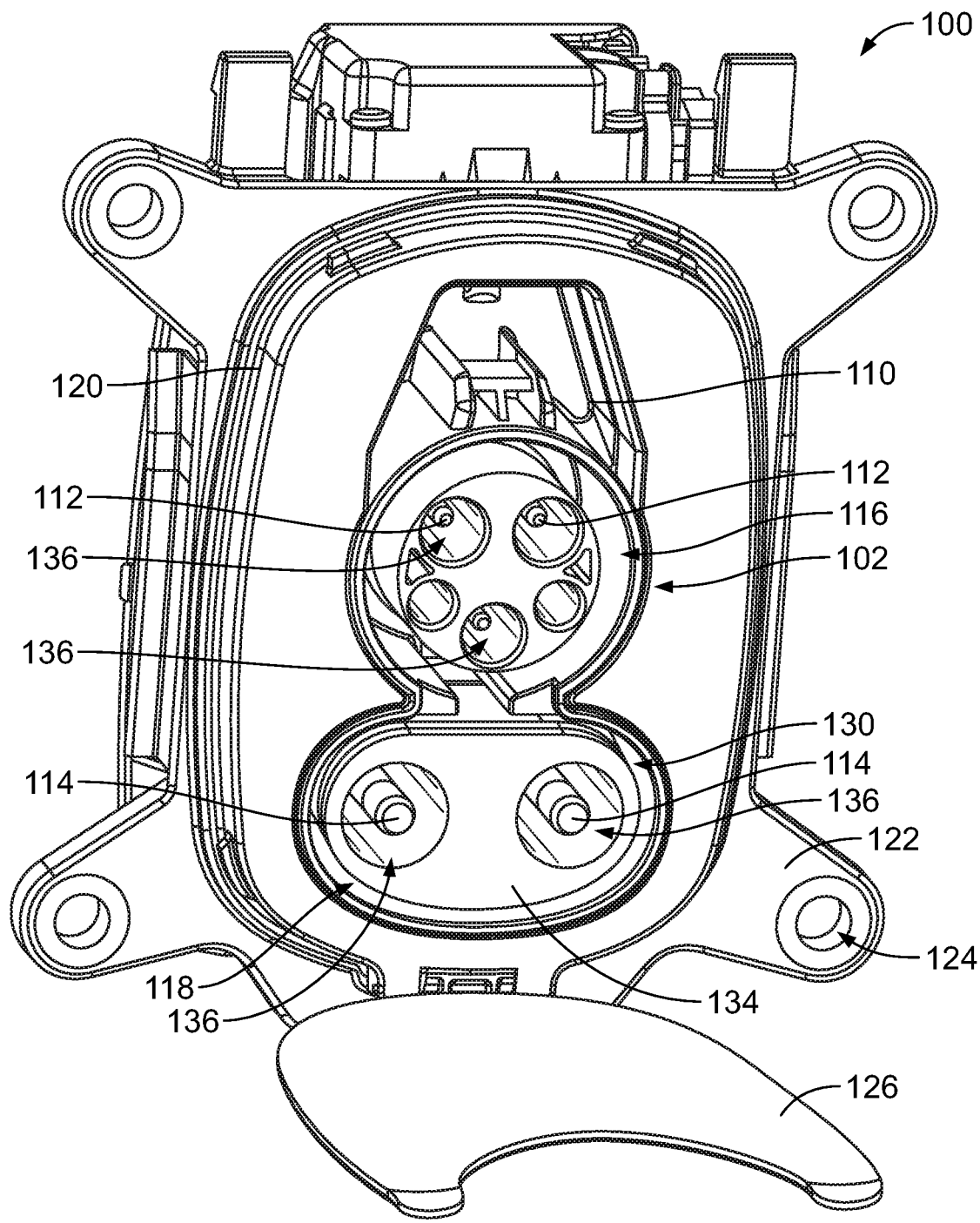
FIG. 2 is a front perspective view of the charging inlet assembly in accordance with an exemplary embodiment.

FIG. 1 is a front perspective view of a charging inlet assembly 100 in accordance with an exemplary embodiment. FIG. 2 is a front perspective view of the charging inlet assembly 100 in accordance with an exemplary embodiment. The charging inlet assembly 100 is used as a charging inlet for a vehicle, such as an electric vehicle (EV) or hybrid electric vehicle (HEV). The charging inlet assembly 100 includes a receptacle connector 102 configured for mating reception with a charging connector (not shown). In an exemplary embodiment, the receptacle connector 102 is configured for mating with a DC fast charging connector, such as the SAE combo CCS charging connector, in addition to AC charging connectors, such as the SAE J1772 charging connector.

The charging inlet assembly 100 includes a housing 110 holding terminal assemblies 112 and terminal assemblies 114. The housing 110 defines the receptacle connector 102. The terminal assemblies 112, 114 form part of the receptacle connector 102 and are configured to be mated to the charging connector. In an exemplary embodiment, the terminal assemblies 112 are AC terminal assemblies and the terminal assemblies 114 are DC terminal assemblies. The terminal assemblies 112 are arranged in a first connector port 116 of the receptacle connector 102 and the terminal assemblies 114 are arranged in a second connector port 118 of the receptacle connector 102.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a cover 126 hingedly coupled to the mounting flange 120 and/or the housing 110. The cover 126 is used to cover the second connector port 118. FIG. 1 illustrates the cover 126 in a closed position. FIG. 2 illustrates the cover in an open position.

In an exemplary embodiment, the housing 110 includes sockets 130 at a front 132 of the housing 110 that receive the charging connector. Extensions 134 extend into the sockets 130. The extensions 134 hold the terminal assemblies 112, 114. The extensions 134 include terminal channels 136 that receive corresponding terminal assemblies 112, 114. In the illustrated embodiment, the housing 110 includes an upper extension 134 that is cylindrical and a lower extension 134 that is oval. The extensions 134 may have other shapes in alternative embodiments. Greater or fewer extensions 134 may be provided in alternative embodiments. In the illustrated embodiment, the upper extension 134 includes three terminal channels 136 holding three corresponding terminal assemblies 112 and the lower extension 134 includes two terminal channels 136 holding two corresponding terminal assemblies 112. However, the extensions 134 may have greater or fewer terminal channels 136 holding corresponding terminal assemblies 112, 114 in alternative embodiments.

Figure 3:
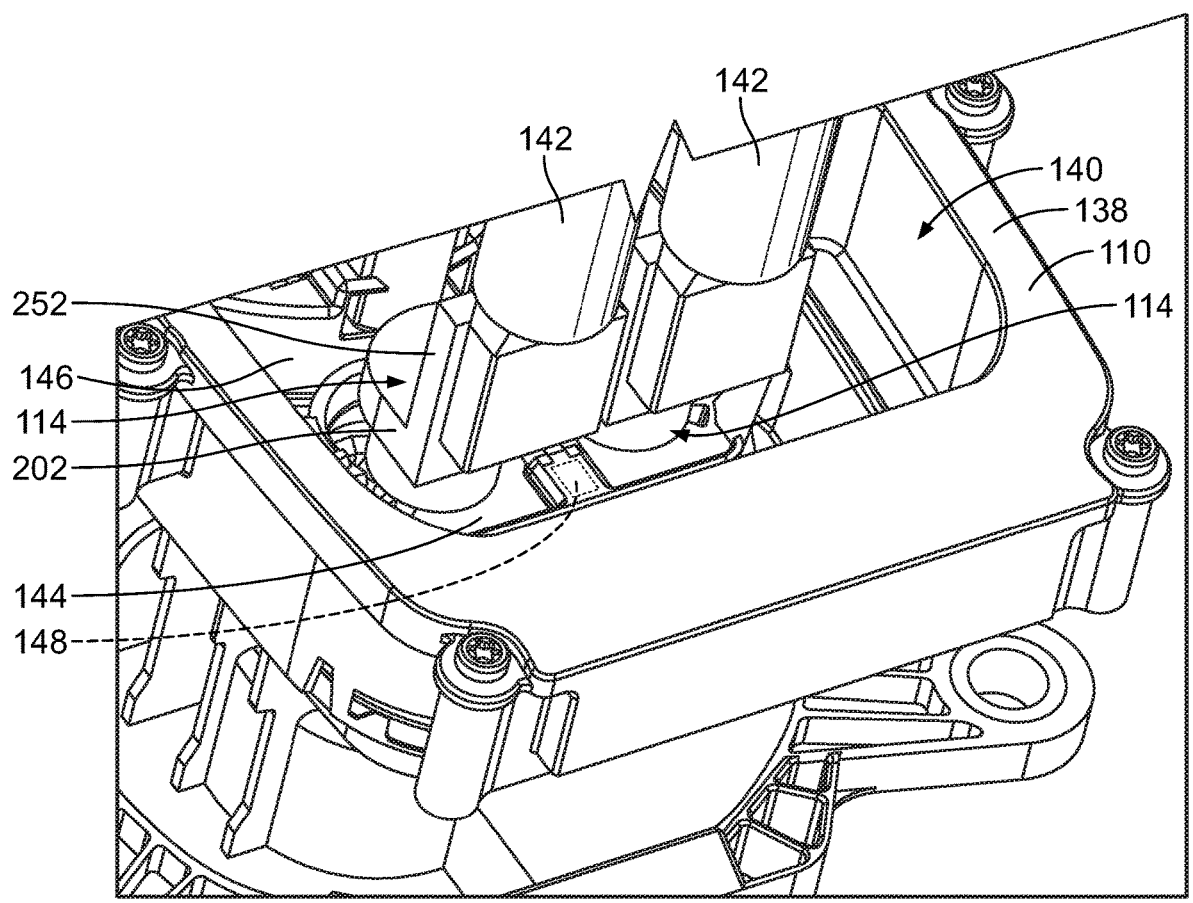
FIG. 3 is a rear perspective view of a portion of the charging inlet assembly in accordance with an exemplary embodiment.

FIG. 3 is a rear perspective view of a portion of the charging inlet assembly 100 in accordance with an exemplary embodiment. The housing 110 extends to a rear 138. The housing 110 has a chamber 140 at the rear 138. The terminal assemblies 112, 114 extend into the chamber 140 and power cables 142 are terminated to the terminal assemblies 112, 114 in the chamber 140. In an exemplary embodiment, the terminal assemblies 112, 114 are short, for example, extending a short distance into the chamber 140 to allow for a low profile or reduced depth housing 110. The power cables 142 may be efficiently routed from the terminal assemblies 114 to reduce the depth of the housing 110. The power cables 142 are routed away from the charging inlet assembly 100, such as to the battery or to another component of the vehicle. Optionally, a cover (not shown) may be coupled to the rear 138 of the housing 110 to enclose the chamber 140. The cover may include cable exits (for example, openings) that receive the power cables 142 and allow the power cables 142 to exit the chamber 140.

In an exemplary embodiment, the charging inlet assembly 100 includes a secondary lock assembly 144 for locking the terminal assemblies 114 in the housing 110. The secondary lock assembly 144 is slidable in the housing 110 between a locked position and an unlocked position. In the locked position, the secondary lock assembly 144 engages the terminal assemblies 114 and blocks the terminal assemblies 114 from backing out of the terminal channels 136 (FIG. 2). In an exemplary embodiment, the charging inlet assembly 100 includes a secondary lock assembly 146 for locking the terminal assemblies 112 (FIG. 2) in the housing 110. The secondary lock assembly 146 is slidable in the housing 110 between a locked position and an unlocked position. In the locked position, the secondary lock assembly 144 engages the terminal assemblies 112 and blocks the terminal assemblies 112 from backing out of the terminal channels 136 (FIG. 2).

In an exemplary embodiment, the charging inlet assembly 100 includes a sensor assembly 148 associated with the secondary lock assembly 144. The sensor assembly 148 is used for sensing a temperature of one or more of the terminal assemblies 114. The sensor assembly 148 may be used to shut off the charging system if the terminal assemblies 114 overheat. In various embodiments, a sensor assembly (not shown) may be associated with the secondary lock assembly 146 for sensing temperature of the terminal assemblies 112.

Figure 4:
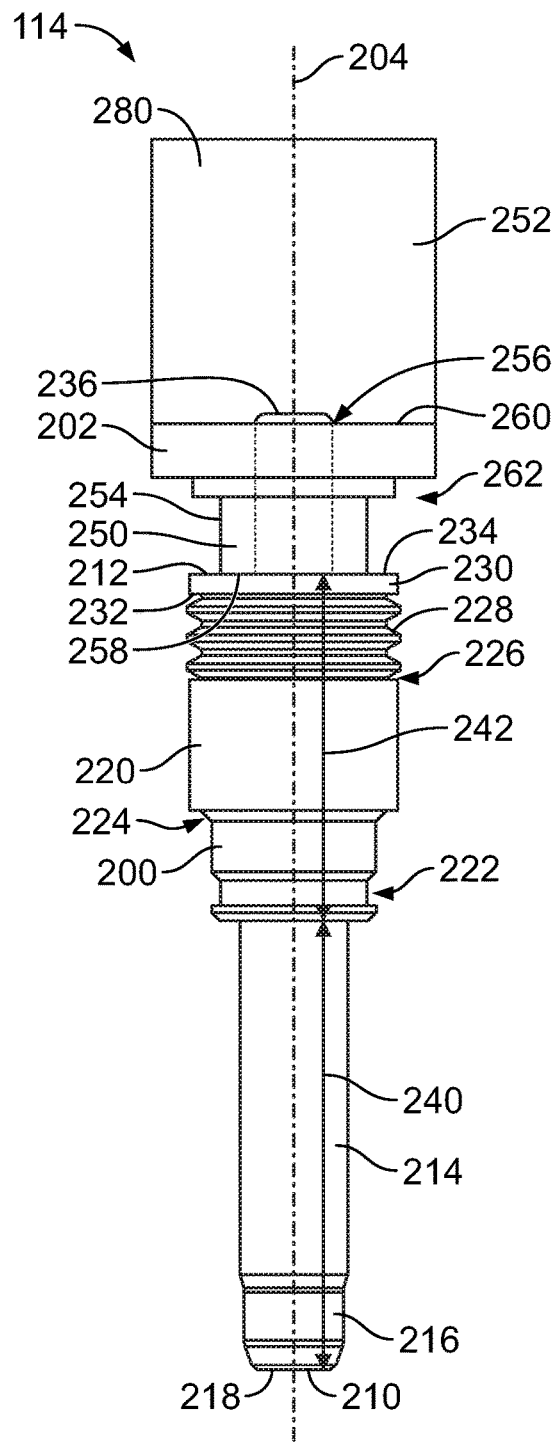
FIG. 4 is a side view of a terminal assembly of the charging inlet assembly in accordance with an exemplary embodiment.
Figure 5:
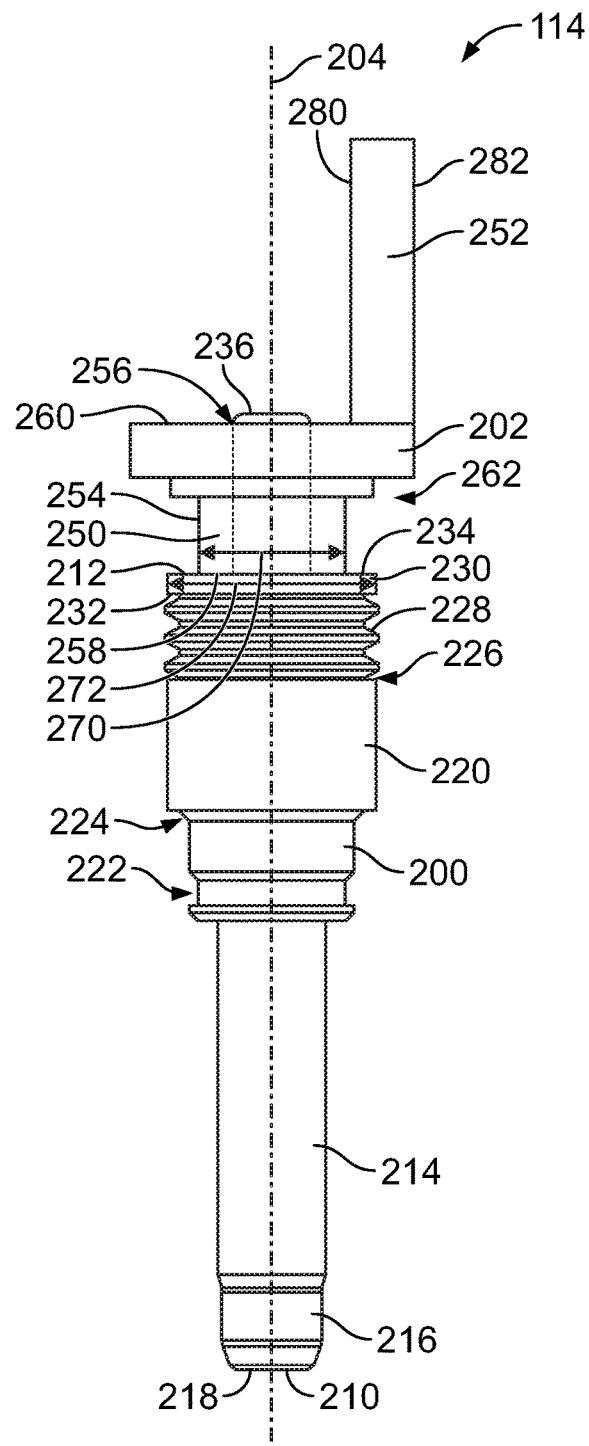
FIG. 5 is another side view of the terminal assembly in accordance with an exemplary embodiment.

FIG. 4 is a side view of the terminal assembly 114 in accordance with an exemplary embodiment. FIG. 5 is another side view of the terminal assembly 114 in accordance with an exemplary embodiment. The terminal assembly 114 includes a pin 200 and a cap 202 extending from the pin 200. The cap 202 may be separate and discrete from the pin 200 configured to be mechanically and electrically coupled to the pin 200. In other various embodiments, the cap 202 is integral with the pin 200, such as formed with the pin 200. The pin 200 is configured to be mated to the charging connector. The cap 202 is configured to be terminated to the power cable 142 (shown in FIG. 3). For example, the power cable 142 may be welded to the cap 202 or may be secured by other processes, such as being crimped, soldered, and the like. In an exemplary embodiment, the cap 202 is configured to be press fit onto the pin 200. However, the cap 202 may be secured to the pin 200 by other processes in alternative embodiments, such as friction stir welding, riveting, a bolted joint, and the like. The terminal assembly 114 extends along a longitudinal axis 204.

The pin 200 is electrically conductive. For example, the pin may be manufactured from a metal material, such as a copper material. In an exemplary embodiment, the pin 200 is screw machined. The pin 200 may be manufactured from a metal alloy (for example, copper alloy) having additives to increase machinability. The pin 200 extends between a front 210 and a rear 212. The pin 200 includes a mating shaft 214 at the front 210 configured to be mated to the charging connector. The mating shaft 214 may be cylindrical. In an exemplary embodiment, the pin 200 includes a cap 216 at a tip 218 of the pin 200. The cap 216 is manufactured from a dielectric material, such as a plastic material. The cap 216 makes the terminal assembly 114 touch-safe at the front of the housing 110.

The pin 200 includes a mounting head 220 at the rear 212 of the pin 200. The mounting head 220 is used for mounting the pin 200 in the housing 110. The cap 202 is coupled to the mounting head 220. In the illustrated embodiment, the mounting head 220 has a larger diameter than the mating shaft 214. In an exemplary embodiment, the mounting head 220 includes a latching groove 222 formed circumferentially around the mounting head 220, such as near a forward end of the mounting head 220. In an exemplary embodiment, the mounting head 220 includes a pin locating shoulder 224 formed circumferentially around the mounting head 220. The pin locating shoulder 224 is used for locating the pin 200 in the terminal channel 136. In an exemplary embodiment, the mounting head 220 includes a seal groove 226 that receives a seal 228. The seal 228 may be located near a rear end of the mounting head 220. The seal 228 may have a diameter approximately equal to or slightly larger than a diameter of the mounting head 220 for interface sealing against an interior surface of the terminal channel 136.

The pin 200 includes a rear flange 230 at the rear 212. The rear flange 230 may define the rear end of the mounting head 220. The rear flange 230 may be located within the terminal channel 136. Optionally, the seal 228 may be immediately forward of the rear flange 230. For example, the seal 228 may be received in a seal channel forward of the rear flange 230. The rear flange 230 has a rear surface 234 facing the cap 202. The rear surface 234 may be perpendicular to the longitudinal axis 204. In an exemplary embodiment, the cap 202 extends from and/or is coupled to the pin 200 at the rear flange 230. The cap 202 may engage the rear surface 234.

In an exemplary embodiment, the pin 200 includes a rear mounting post 236 (shown in phantom) extending rearward from the rear flange 230. The cap 202 may be press-fit on the rear mounting post 236. The rear mounting post 236 has a reduced diameter compared to the rear flange 230. The rear mounting post 236 may be cylindrical, such as to allow the cap 202 to be rotatably positionable on the pin 200. However, the rear mounting post 236 may have other shapes in alternative embodiments.

In an exemplary embodiment, the mating shaft 214 has a length 240 between the tip 218 and the mounting head 220. The mounting head 220 has a length 242 between the mating shaft 214 and the rear surface 234 of the rear flange 230. In an exemplary embodiment, the length 242 of the mounting head 220 is shorter than the length 240 mating shaft 214. Having a short mounting head 220 positions the cap 202 closer to the mating shaft 214, reducing the overall length of the terminal assembly 114.

The cap 202 includes a base 250 and a pad 252 extending from the base 250. The base 250 is coupled to the pin 200. In the illustrated embodiment, the base 250 is cylindrical; however, the base 250 may have other shapes in alternative embodiments. The base 250 has a base wall 254 surrounding an opening 256 (shown in FIG. 4). The opening 256 receives the rear mounting post 236. The base wall 254 extends between a front 258 of the cap 202 and a cap wall 260 at a rear end of the base 250. The pad 252 extends from the cap wall 260. In the illustrated embodiment, the cap wall 260 is oriented perpendicular to the longitudinal axis 204. In an exemplary embodiment, the base 250 is undercut forward of the cap wall 260 to form a pocket 262 forward of the cap wall 260. The pocket 262 extends along the base wall 254. The pocket 262 is located rearward of the rear flange 230.

The base 250 has a base diameter 270 (FIG. 5). The rear flange 230 has a rear flange diameter 272 larger than the base diameter 270. The terminal assembly 114 is stepped inward at the pocket 262 from the rear flange 230 to the cap wall 260 to receive the secondary lock assembly 144 (shown in FIG. 3). The rear surface 234 and the base wall 254 are exposed and configured to be engaged by the secondary lock assembly 144. The rear surface 234 forms a locking surface for the secondary lock assembly 144.

The pad 252 includes a first surface 280 and a second surface 282 opposite the first surface 280. Optionally, the first and second surfaces 280, 282 may be planar surfaces. The first and second surfaces 280, 282 are oriented parallel to the longitudinal axis 204. The first and second surfaces 280, 282 may be perpendicular to the cap wall 260. The pad 252 may be rectangular in shape; however, the pad 252 may have other shapes in alternative embodiments. In various embodiments, the pad 252 is a weld pad and the power cable 142 (FIG. 3) is configured to be welded to the pad 252, such as to the first surface 280 and/or the second surface 282. In other various embodiments, the pad 252 may be attached to the power cable 142 by other means, such as by crimping to the power cable 142. For example, the pad 252 may be curved into a barrel shape or bore shape configured to be crimped and compressed around the power cable 142.

Figure 6:
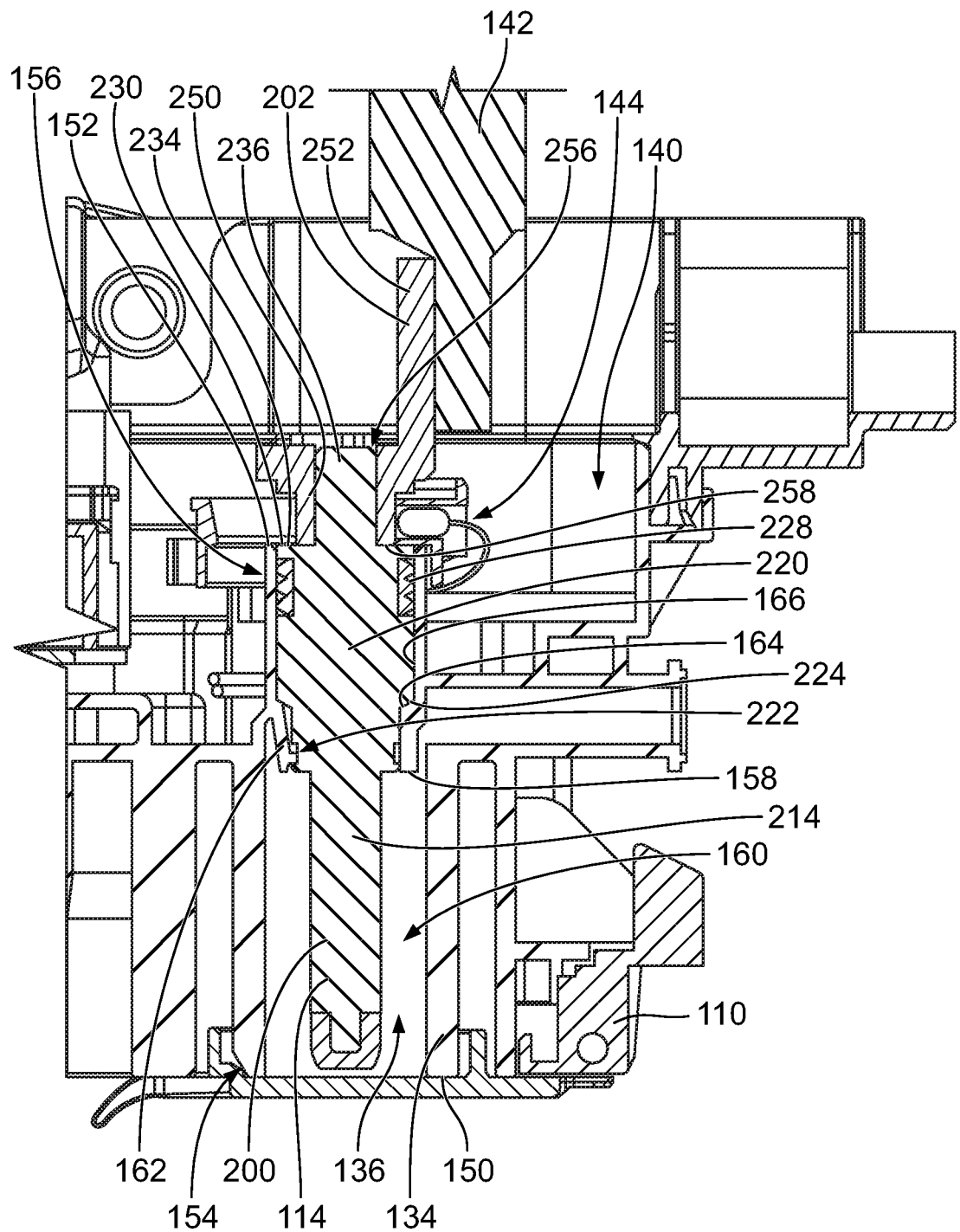
FIG. 6 is a cross sectional view of the charging inlet assembly in accordance with an exemplary embodiment.

FIG. 6 is a cross sectional view of the charging inlet assembly 100 in accordance with an exemplary embodiment. FIG. 6 illustrates the terminal assembly 114 coupled to the housing 110. FIG. 6 illustrates the secondary lock assembly 144 interfacing with the terminal assembly 114 within the chamber 140. The terminal assembly 114 is short (for example, extends a short distance into the chamber 140) to reduce an overall profile or width of the charging inlet assembly 100. The terminal assembly 114 is received in the corresponding terminal channel 136. The extension 134 defines the terminal channel 136. The extension 134 extends between a front edge 150 and a rear edge 152. The terminal channel 136 includes a front end 154 and a rear end 156. The mating shaft 214 of the pin 200 is located in the front end 154 and the mounting head 220 of the pin 200 is located in the rear end 156. A mid-wall 158 separates the front end 154 and the rear end 156 of the terminal channel 136.

The terminal channel 136 includes a bore 160 at the front end 154 of the terminal channel 136 configured to receive a portion of the charging connector. The bore 160 is oversized relative to the mating shaft 214 such that a space is defined around the mating shaft 214 that receives a charging conductor of the charging connector.

The housing 110 includes a primary latch 162 extending into the terminal channel 136 to engage and retain the terminal assembly 114 in the terminal channel 136. The primary latch 162 may be a deflectable latch. The primary latch 162 may be integral with the housing 110, such as co molded with the housing 110. In the illustrated embodiment, the primary latch 162 is located at the mid-wall 158. The primary latch 162 is latchably received in the latching groove 222 to axially secure the pin 200 in the terminal channel 136. The primary latch 162 resists rearward pull out of the terminal assembly 114 from the terminal channel 136. Optionally, the pin 200 may be rotatable within the terminal channel 136. For example, the pin 200 may rotate with the primary latch 162 in the latching groove 222.

The housing 110 includes a housing shoulder 164 extending into the terminal channel 136 to interface with and locate the terminal assembly 114 in the terminal channel 136. The terminal channel 136 is stepped inward to define the housing shoulder 164. The pin locating shoulder 224 of the pin 200 engages the housing shoulder 164 to locate the terminal assembly 114 in the terminal channel 136. The terminal assembly 114 may bottom out against the housing shoulder 164. For example, the housing shoulder 164 may stop further forward advancement of the terminal assembly 114 once the locating shoulder 224 engages the housing shoulder 164. The housing shoulder 164 may be a step, rib, tab, or other protruding feature. The housing shoulder 164 may extend circumferentially around the terminal channel 136 or partially circumferentially around the terminal channel 136.

The terminal channel 136 includes an interior surface 166 along the rear end 156. The mounting head 220 may engage the interior surface 166 by an interference fit, such as to tightly hold the pin 200 in the terminal channel 136. In an exemplary embodiment, the seal 228 is sealed to the interior surface 166, such as proximate to the rear edge 152.

In an exemplary embodiment, the terminal assembly 114 is located in the terminal channel 136 such that the cap 202 and the secondary lock assembly 144 are located immediately rearward of the rear edge 152 of the extension 134. The rear flange 230 of the pin 200 is located in the terminal channel 136. For example, the rear surface 234 is coplanar with the rear edge 152. In an exemplary embodiment, the rear mounting post 236 and the cap 202 extend into the chamber 140, but other portions of the pin 200 are forward of the rear edge 152 in the terminal channel 136. The rear mounting post 236 is received in the opening 256 of the base 250 and the base 250 is press fit onto the rear mounting post 236 at a press fit joint. The press fit joint creates a low resistance interface between the pin 200 and the cap 202. Optionally, the cap 202 is pressed onto the pin 200 until the front 258 bottoms out against and engages the rear flange 230.

The power cable 142 is coupled to the pad 252 within the chamber 140. In an exemplary embodiment, the power cable 142 is ultrasonically welded to the pad 252, creating a low resistance interface between the terminal assembly 114 and the power cable 142. In other various embodiments, the power cable 142 may be crimped or otherwise mechanically and electrically terminated to the pad 252.

The secondary lock assembly 144 is used as a safety feature as a terminal position assurance device and a locking device for the terminal assembly 114. The secondary lock assembly 144 is movable between a locked position and an unlocked position. In the locked position, the secondary lock assembly 144 engages the terminal assembly 114 and blocks the terminal assembly 114 from backing out of the terminal channel 136. However, the secondary lock assembly 144 is unable to move to the locked position if the terminal assembly 114 is not fully loaded into the terminal channel 136 (for example, only partially loaded into the terminal channel 136) because the mounting head 220 would block the secondary lock assembly 144 from sliding to the locked position. Thus, the secondary lock assembly 144 provides a visual indicator to the assembler that the terminal assembly 144 is not fully loaded if the secondary lock assembly 144 is blocked from moving to the locked position. In an exemplary embodiment, a rear cover (not shown) configured to be coupled to the rear end of the housing 110, includes an interference feature aligned with the secondary lock assembly 144. The interference feature interferes with the secondary lock assembly 144 if the secondary lock assembly 144 is in the unlocked position. As such, the rear cover is unable to be coupled to the housing 110 if the secondary lock assembly 144 is in the unlocked position. Only when the secondary lock assembly 144 is moved to the locked position does the interference feature clear the secondary lock assembly 144 allowing the rear cover to fully seat on the housing 110.

Figure 7A:
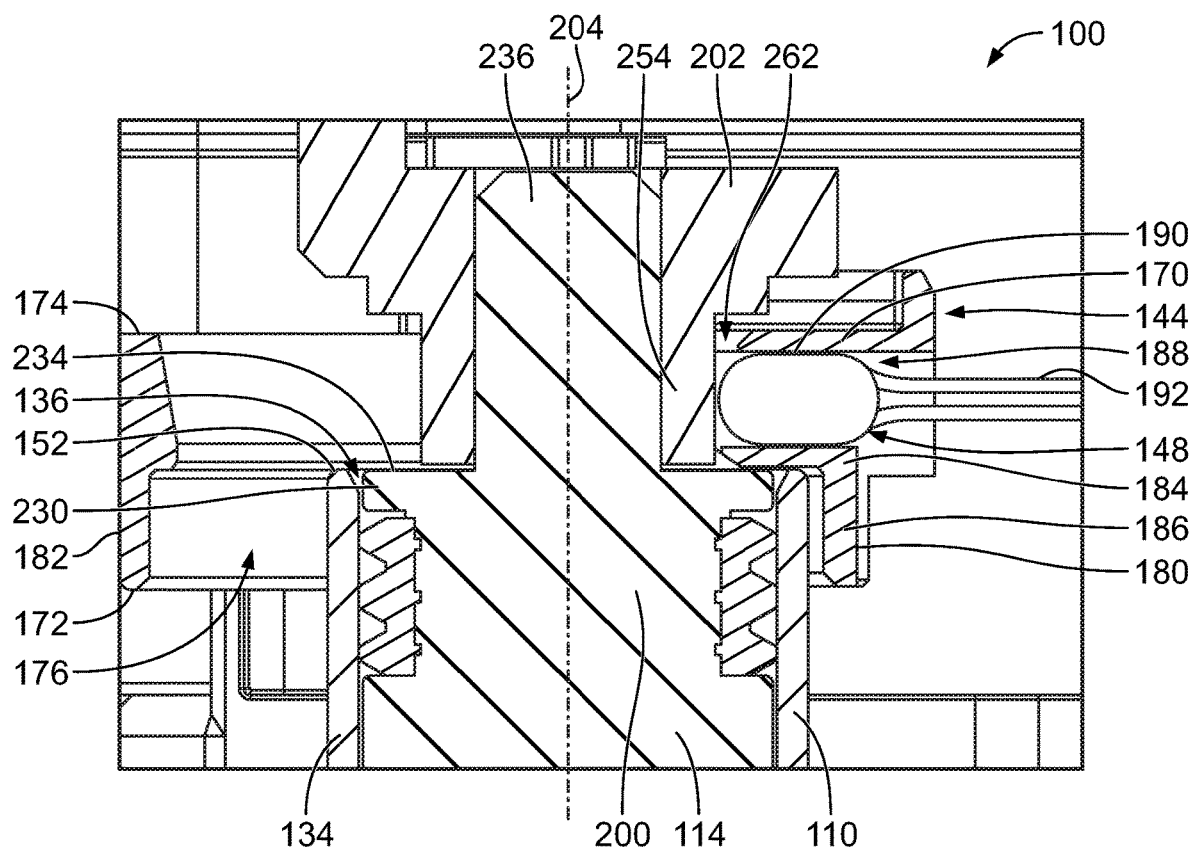
FIG. 7A is an enlarged, cross-sectional view of the charging inlet assembly in accordance with an exemplary embodiment showing a secondary lock assembly in a locked position.
Figure 7B:
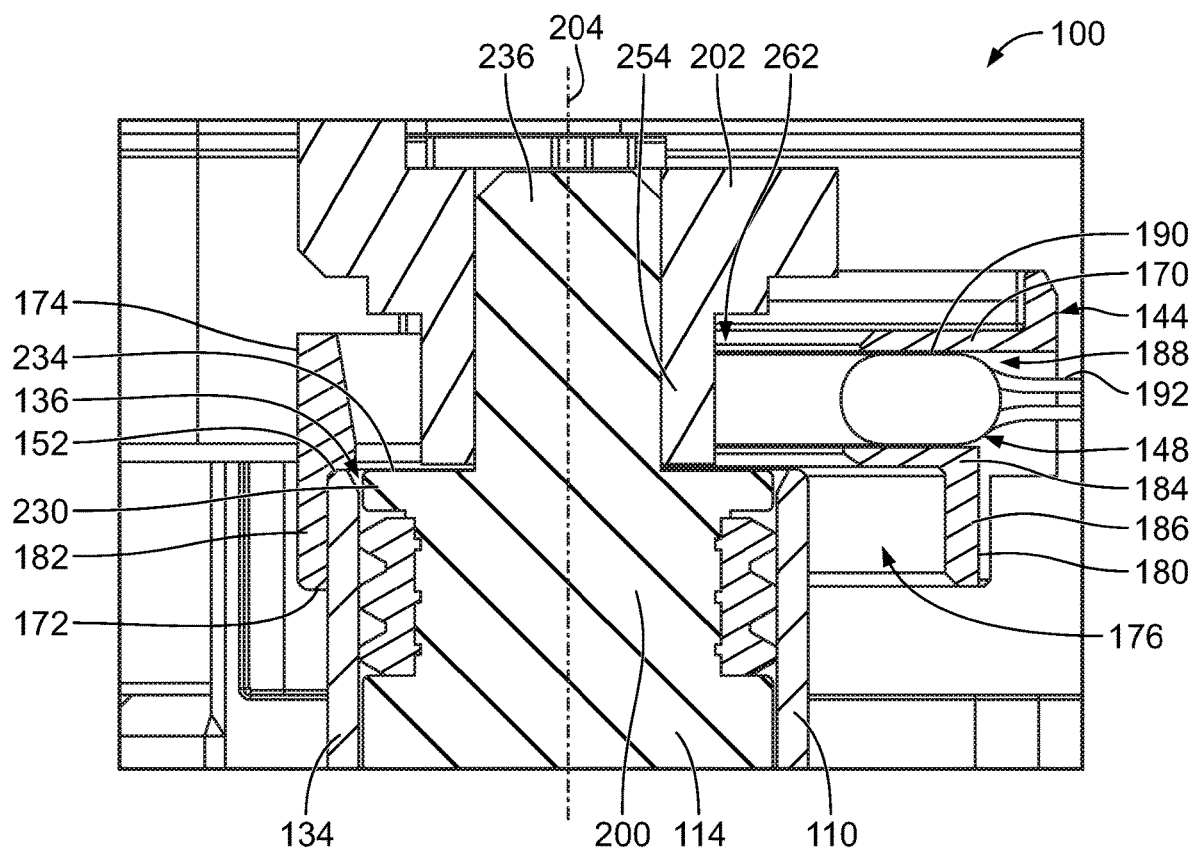
FIG. 7B is an enlarged, cross-sectional view of the charging inlet assembly in accordance with an exemplary embodiment showing a secondary lock assembly in an unlocked position.

FIG. 7A is an enlarged, cross-sectional view of the charging inlet assembly 100 in accordance with an exemplary embodiment showing the secondary lock assembly 144 in a locked position. FIG. 7B is an enlarged, cross-sectional view of the charging inlet assembly 100 in accordance with an exemplary embodiment showing the secondary lock assembly 144 in an unlocked position. The secondary lock assembly 144 includes a secondary lock body 170 having a front 172 and a rear 174. The secondary lock body 170 includes an opening 176 receiving the terminal assembly 114. Optionally, the opening 176 may receive a portion of the housing 110, such as the rear end of the extension 134. The secondary lock assembly 144 includes a first side 180 and a second side 182. The first side 180 is used to lock the terminal assembly 114 in the terminal channel 136. The first side 180 is slid toward the extension 134 in the locked position. The second side 182 is slid toward the extension 134 in the unlocked position.

The secondary lock body 170 includes a locking wall 184 at the first side 180. The locking wall 184 is located rearward of the terminal assembly 114 in the locked position to block removal of the terminal assembly 114 from the terminal channel 136. The locking wall 184 is positioned rearward of the rear surface 234 of the rear flange 230. The locking wall 184 is positioned rearward of the rear edge 152 of the extension 134. In an exemplary embodiment, the locking wall 184 is received in the pocket 262 adjacent the base wall 254. The locking wall 184 may abut against the base wall 254. In an exemplary embodiment, the secondary lock assembly 144 is axially aligned along the longitudinal axis 204 with the cap 202 and the rear mounting post 236. The secondary lock assembly 144 engages the cap 202. The locking wall 184 is moved clear of (for example, to the right in the illustration) the rear flange 230 and the extension 134 in the unlocked position.

The secondary lock body 170 includes a locating wall 186 at the first side 180. The locating wall 186 is used to position the secondary lock body 170 relative to the housing 110. In an exemplary embodiment, the locating wall 186 is configured to engage the extension 134. The locating wall 186 may extend forward from the locking wall 184.

In an exemplary embodiment, the secondary lock body 170 includes a channel 188, such as in the locking wall 184, that receives the sensor assembly 148. The channel 188 may be open at the first side 180 to receive the sensor assembly 148. In an exemplary embodiment, the sensor assembly 148 includes a temperature sensor 190. In the illustrated embodiment, the temperature sensor 190 is provided at ends of wires 192. However, the temperature sensor 190 may be mounted to a circuit board in alternative embodiments. The temperature sensor 190 is located in the channel 188 of the locking wall 184 proximate to the terminal assembly 114 to sense a temperature of the terminal assembly 114. For example, the temperature sensor 190 is located proximate to the cap 202 and/or the rear flange 230 to sense the temperature of the cap 202 and/or the pin 200. In various embodiments, the secondary lock assembly 144 may include an electrical insulator (not shown) in the channel 188 providing an insulated interface to the secondary lock body 170 and/or the cap 202 to electrically isolate the sensor assembly 148 from the terminal assembly 114. In an exemplary embodiment, the electrical insulator is manufactured from a thermally conductive material to allow the temperature sensor 190 to measure the temperature of the cap 202 and/or the pin 200. The insulator may be manufactured from a silicone material in various embodiments. The insulator may engage the base wall 254 in various embodiments.

Figure 8:
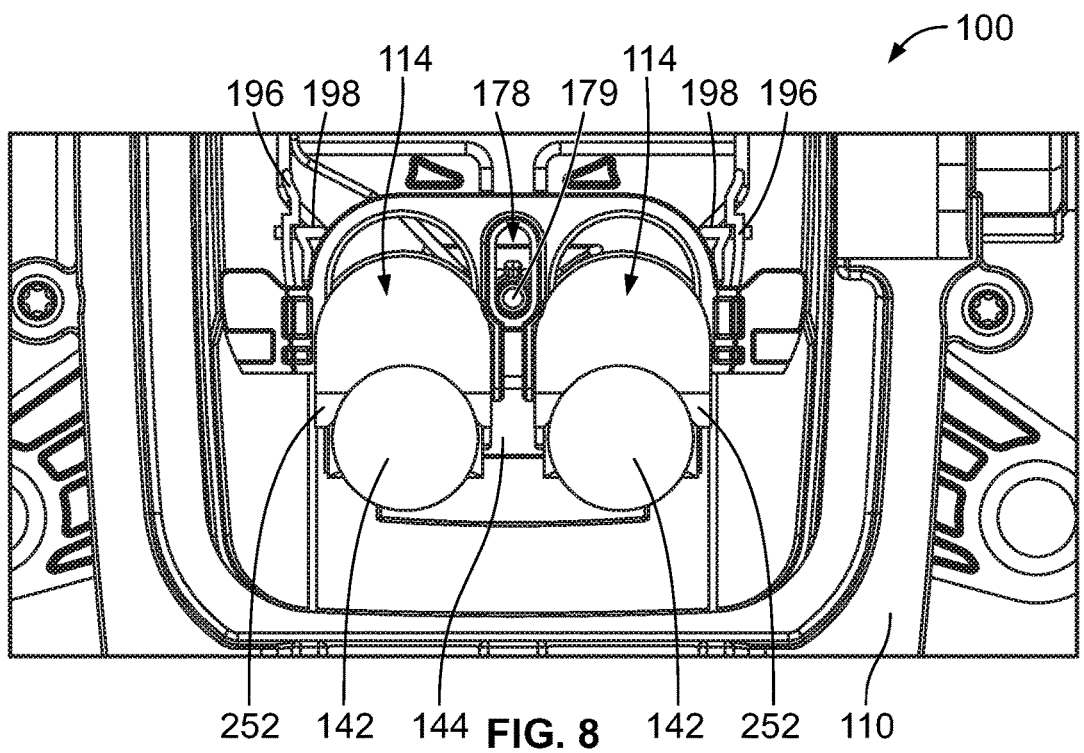
FIG. 8 is a rear view of the charging inlet assembly in accordance with an exemplary embodiment showing the secondary lock assembly in a locked position.
Figure 9:
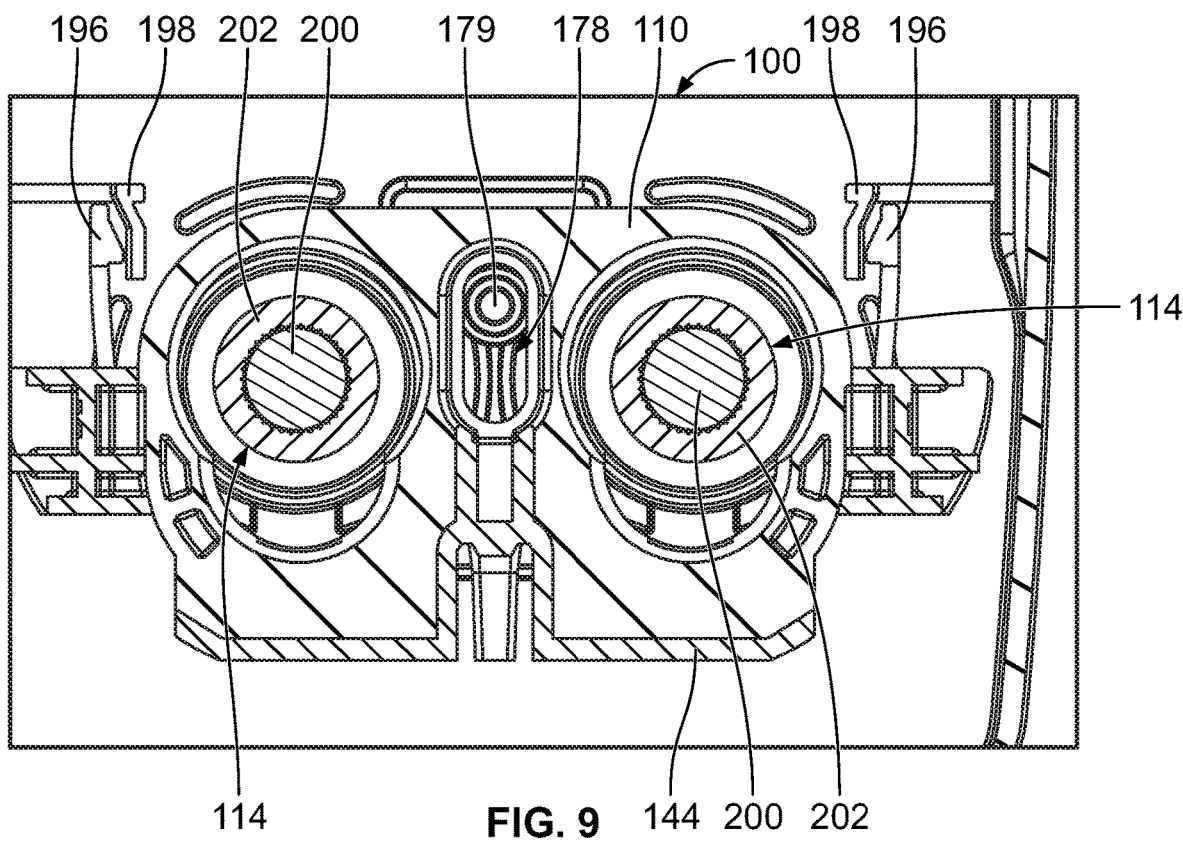
FIG. 9 is a cross-sectional view of the charging inlet assembly in accordance with an exemplary embodiment showing the secondary lock assembly in an unlocked position.

FIG. 8 is a rear view of the charging inlet assembly 100 in accordance with an exemplary embodiment showing the secondary lock assembly 144 in a locked position. FIG. 9 is a cross-sectional view of the charging inlet assembly 100 in accordance with an exemplary embodiment showing the secondary lock assembly 144 in an unlocked position. The secondary lock assembly 144 includes latches 196 configured to latchably engage latching features 198 of the housing 110 to secure the secondary lock assembly 144 in the locked position. The latches 196 are deflectable and may be unlatched. In an exemplary embodiment, the secondary lock assembly 144 includes a guide slot 178 that slides on a guide post 179 of the housing 110 to guide movement of the secondary lock assembly 144 between the unlocked position and the locked position.

FIGS. 8 and 9 illustrate the power cables 142 relative to the terminal assemblies 114 in accordance with an exemplary embodiment. FIG. 8 shows the power cables 142 extending from the pads 252 of the terminal assemblies 114. FIG. 9 shows the pins 200 and the caps 202 of the terminal assemblies 114. In the illustrated embodiment, the power cables 142 extend outward away from the terminal assemblies 114, such as parallel to the longitudinal axes of the terminal assemblies 114. However, in alternative embodiments, the power cables 142 may extend in other directions, such as perpendicular to the longitudinal axes of the terminal assemblies 114. For example, FIGS. 10-13 illustrate alternative orientations of the power cables 142 relative to the terminal assemblies 114 for various power cable routing from the housing 110.

Figure 10:
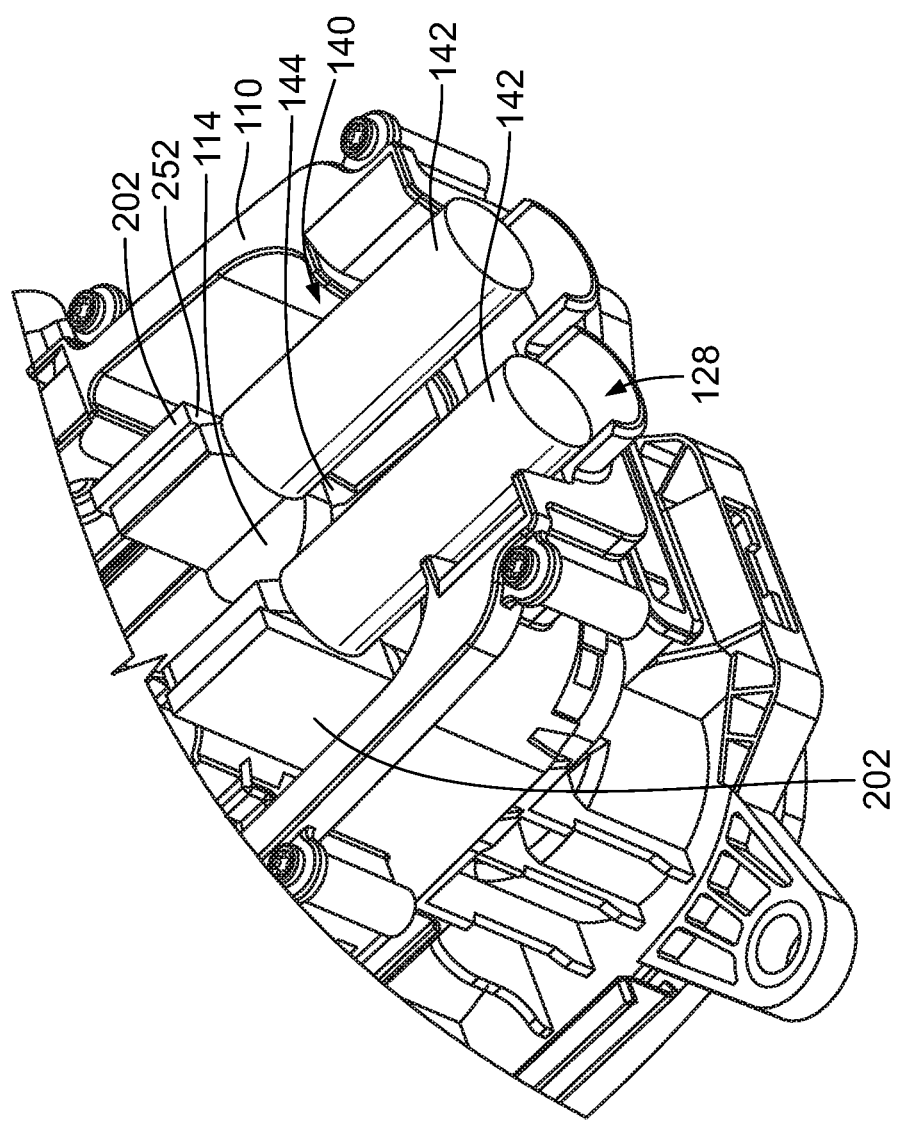
FIG. 10 is a rear perspective view of the charging inlet assembly in accordance with an exemplary embodiment.
Figure 11:
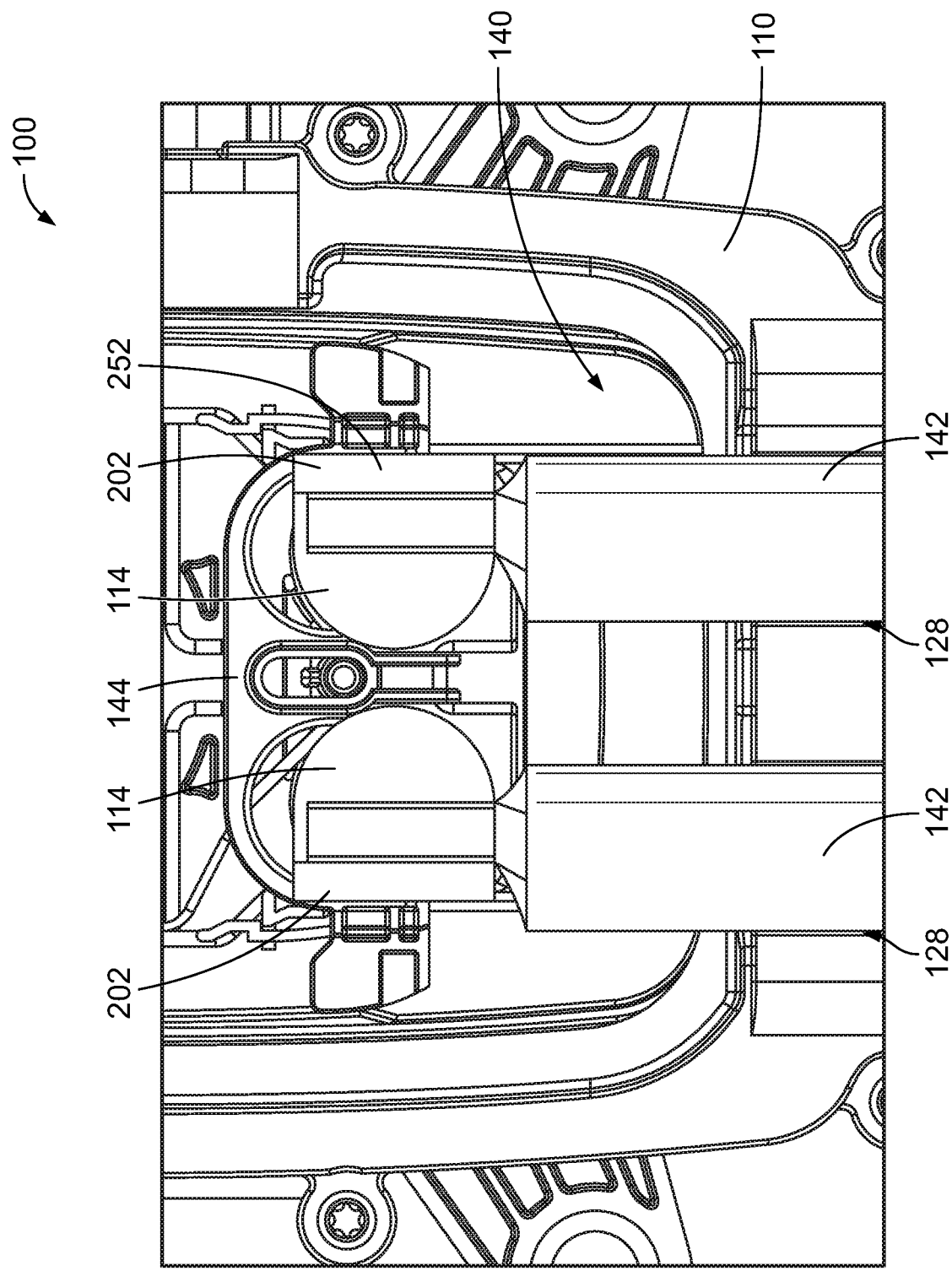
FIG. 11 is a rear view of the charging inlet assembly in accordance with an exemplary embodiment.
Figure 12:
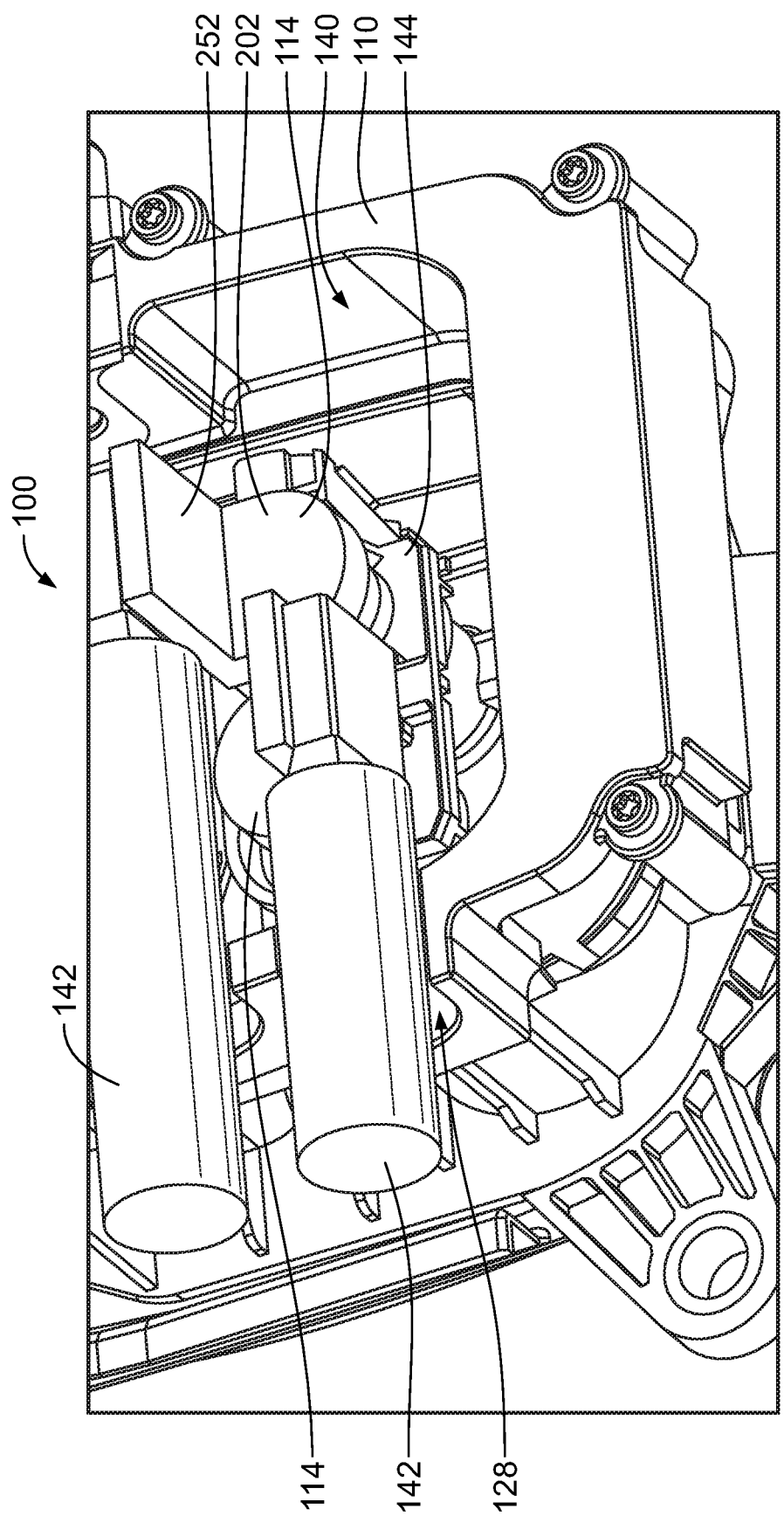
FIG. 12 is a rear perspective view of the charging inlet assembly in accordance with an exemplary embodiment.
Figure 13:
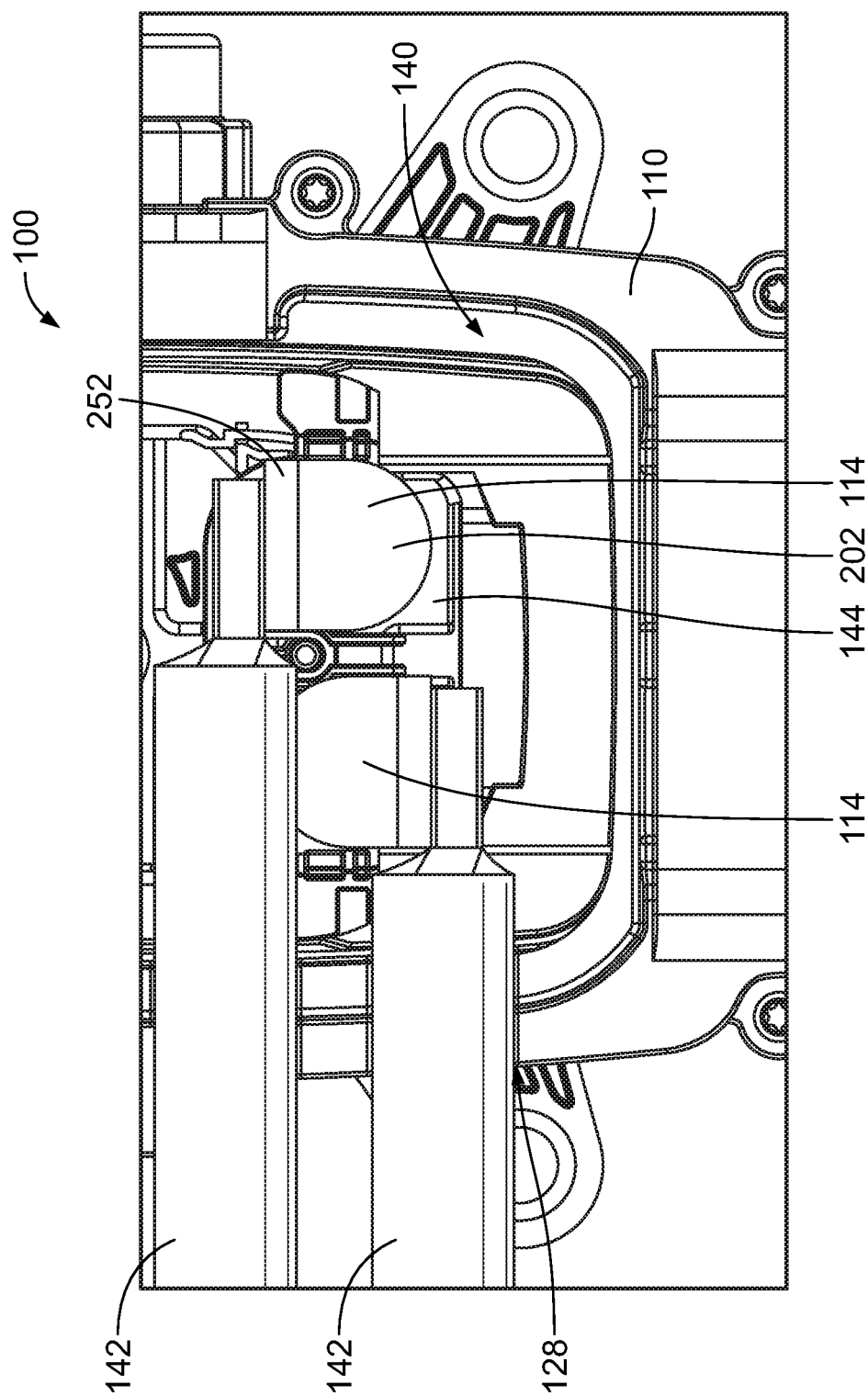
FIG. 13 is a rear view of the charging inlet assembly in accordance with an exemplary embodiment.

FIG. 10 is a rear perspective view of the charging inlet assembly 100 in accordance with an exemplary embodiment. FIG. 11 is a rear view of the charging inlet assembly 100 in accordance with an exemplary embodiment. FIG. 12 is a rear perspective view of the charging inlet assembly 100 in accordance with an exemplary embodiment. FIG. 13 is a rear view of the charging inlet assembly 100 in accordance with an exemplary embodiment. With additional reference back to FIG. 3, the terminal assemblies 114 are configured to be positioned in different orientations relative to the housing 110 for various power cable routing from the housing 110.

In an exemplary embodiment, the terminal assemblies 114 may be rotatable within the terminal channels 136 to vary positions of the pads 252 (for example, horizontally, vertically or at other orientations) in the chamber 140. The caps 202 may be selectively coupled to the rear mounting posts 236 (shown in FIG. 4) at different rotatable positions on the rear mounting posts 236 to vary angular positions of the pads 252 in the chamber 140 (for example, at 0°, 90°, 180°, 270° or at other angular positions). By varying the angular orientation of the pads 252 within the chamber 140, the cable exit directions may be varied. The power cables 142 are configured to interface with the pads 252 in different orientations for different routing schemes from the housing 110. For example, the power cables 142 may be oriented parallel to the longitudinal axes 204, may be perpendicular to the longitudinal axes 204, or may be at other angular orientations relative to the terminal assemblies 114.

Different vehicles may require the power cables 142 to be routed in different directions (for example, downward, upward, right, left, rearward, and the like) from the housing 110. To reduce the length of the power cables 142 and to reduce the depth of the chamber 140 needed for routing (for example, bending or manipulating) the power cables 142 from the terminal assemblies 114, the pads 252 of the terminal assemblies 114 support multiple cable exit directions. FIG. 3 illustrates the power cables 142 exiting the terminal assemblies 114 and the housing 110 in a rearward direction. FIGS. 10 and 11 illustrate the power cables 142 exiting the terminal assemblies 114 and the housing 110 in a downward direction. FIGS. 12 and 13 illustrate the power cables 142 exiting the terminal assemblies 114 and the housing 110 in a sideways direction. In an exemplary embodiment, the housing 110 includes cable exits 128 providing ports to guide the power cables 142 through the housing 110 between the chamber 140 and the exterior of the charging inlet assembly 100. The cable exits 128 may be at various appropriate locations in the different embodiments (for example, along the bottom, the side, and the like).

The depth of the charging inlet assembly 100 is reduced by limiting or reducing the lengths of the terminal assemblies 114, controlling the location of the secondary lock assembly 144 and controlling routing of the power cables 142 from the pads 252. The cable exit directions from the cable exits 128 may be from the bottom or the sides to reduce the overall depth of the charging inlet assembly 100. In various embodiments, coupling the secondary lock assembly to the cap 202, rather than to a dedicated locking collar or other section of the pin, reduces the overall length of the terminal assembly 114.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle connector for a charging inlet assembly comprising:
   a housing extending between a front and a rear, the housing having a chamber at the rear, the housing having a terminal channel between the front and the rear, the housing having a primary latch extending into the terminal channel;
   a terminal assembly coupled to the housing, the terminal assembly including a pin and a cap extending from the pin in the chamber, the pin extending between a front and a rear, the pin having a mating shaft at the front, the mating shaft positioned in the terminal channel for mating with a charging connector, the pin having a mounting head at the rear, the mounting head having a latching groove receiving the primary latch to hold the pin in the terminal channel, the primary latch defining a primary lock for retaining the terminal assembly in the housing, the mounting head having a rear flange at the rear, the cap having a base and a pad extending from the base, the pad configured to be coupled to a power cable;
   a secondary lock assembly in the chamber defining a secondary lock for retaining the terminal assembly in the housing, the secondary lock assembly coupled to the terminal assembly, the secondary lock assembly having a secondary lock body including a locking wall, the secondary lock movable between a locked position and an unlocked position, the locking wall positioned rearward of the rear flange and engaging the rear flange in the locked position to block rearward movement of the rear flange of the pin, the locking wall being disengaged from the rear flange of the pin in the unlocked position.

2. The receptacle connector of claim 1, wherein the secondary lock assembly engages the cap.

3. The receptacle connector of claim 1, wherein the housing includes an extension defining the terminal channel, the extension having a rear edge, the pin being received in the terminal channel such that the rear flange is co-planer with the rear edge, the locking wall engaging the rear edge in the locked position.

4. The receptacle connector of claim 3, wherein the base engages the rear flange.

5. The receptacle connector of claim 1, further comprising a seal coupled to the mounting head of the pin, the seal being positioned in the terminal channel and sealed against the housing, the cap being coupled to the pin adjacent the seal.

6. The receptacle connector of claim 5, wherein the seal is located immediately forward of the rear flange.

7. The receptacle connector of claim 1, wherein the terminal assembly extends along a longitudinal axis, the secondary lock assembly being axially aligned with the cap along the longitudinal axis.

8. The receptacle connector of claim 1, wherein the pin includes a rear mounting post extending rearward from the rear flange, the base being coupled to the rear mounting post, the terminal assembly extends along a longitudinal axis, the secondary lock assembly being axially aligned with the rear mounting post along the longitudinal axis.

9. The receptacle connector of claim 1, wherein the secondary lock assembly includes a sensor assembly received in the secondary lock body, the sensor assembly having a temperature sensor positioned proximate to the cap.

10. The receptacle connector of claim 1, wherein the mounting head includes a rear mounting post extending rearward from the rear flange, the base of the cap including an opening receiving the rear mounting post, and a base wall surrounding the opening.

11. The receptacle connector of claim 10, wherein the base wall includes a pocket receiving a temperature sensor of a sensor assembly, the temperature sensor being positioned proximate to an interface between the cap and the rear mounting post when positioned in the pocket.

12. The receptacle connector of claim 10, wherein the rear mounting post is cylindrical and the opening as cylindrical to position the pad at different rotatable positions relative to the pin.

13. The receptacle connector of claim 1, wherein the cap is coupled to the pin at a press-fit joint.

14. The receptacle connector of claim 1, wherein the pad is variably positionable in the chamber by selectively coupling the cap to a rear mounting post of the pin, the rear mounting post extending rearward from the rear flange.

15. A charging inlet assembly comprising:
a housing extending between a front and a rear, the housing defining a receptacle connector at the front configured for mating reception of a charging connector, the housing having a chamber at the rear, the housing having a terminal channel between the front and the rear, the housing having a primary latch extending into the terminal channel;
a terminal assembly coupled to the housing, the terminal assembly including a pin and a cap mechanically and electrically coupled to the pin, the pin extending between a front and a rear, the pin having a mating shaft at the front, the mating shaft positioned in the terminal channel for mating with the charging connector, the pin having a mounting head at the rear, the mounting head positioned in the terminal channel, the mounting head being coupled to the primary latch to hold the pin in the terminal channel, the primary latch defining a primary lock for retaining the terminal assembly in the housing, the mounting head having a rear flange at the rear, the cap coupled to the pin in the chamber, the cap having a base and a pad extending from the base, the base coupled to the rear of the pin, the pad configured to be coupled to a power cable;
a secondary lock assembly in the chamber defining a secondary lock for retaining the terminal assembly in the housing, the secondary lock assembly coupled to the terminal assembly, the secondary lock assembly having a secondary lock body including a locking wall, the locking wall engaging and blocking rearward movement of the rear flange of the pin, the secondary lock assembly including a sensor assembly received in the secondary lock body, the sensor assembly having a temperature sensor positioned proximate to the cap to sense a temperature of the terminal assembly.

16. The receptacle connector of claim 15, wherein the secondary lock assembly engages the cap.

17. The receptacle connector of claim 15, wherein the terminal assembly extends along a longitudinal axis, the secondary lock assembly being axially aligned with the cap along the longitudinal axis.

18. A receptacle connector for a charging inlet assembly comprising:
a housing extending between a front and a rear, the housing having a chamber at the rear, the housing having a terminal channel between the front and the rear, the housing having a primary lock;
a terminal assembly coupled to the housing, the terminal assembly including a pin and a cap extending from the pin in the chamber, the pin extending along a longitudinal axis between a front and a rear, the pin having a mating shaft at the front, the mating shaft positioned in the terminal channel for mating with a charging connector, the pin having a mounting head at the rear, the mounting head having a rear flange at the rear, the cap having a base and a pad extending from the base, the base of the cap being selectively coupled to the mounting head of the pin at variable rotational positions to vary a rotational orientation of the pad with respect to the pin;
a secondary lock assembly in the chamber defining a secondary lock for retaining the terminal assembly in the housing, the secondary lock assembly coupled to the terminal assembly, the secondary lock assembly having a secondary lock body including a locking wall, the secondary lock movable between a locked position and an unlocked position, the locking wall positioned rearward of the rear flange and engaging the rear flange in the locked position to block rearward movement of the rear flange of the pin, the locking wall being disengaged from the rear flange of the pin in the unlocked position.

19. The receptacle connector of claim 18, further comprising a power cable coupled to the pad, the power cable extending from the pad parallel to the longitudinal axis.

20. The receptacle connector of claim 18, further comprising a power cable coupled to the pad, the power cable extending from the pad perpendicular to the longitudinal axis, wherein a direction that the power cable extends from the terminal assembly is controlled based on the rotational orientation of the pad relative to the mounting head of the pin.

* * * * *